US009885322B2

(12) United States Patent
Takezawa et al.

(10) Patent No.: US 9,885,322 B2
(45) Date of Patent: Feb. 6, 2018

(54) FUEL EVAPORATIVE EMISSION PROCESSING SYSTEM

(71) Applicant: Nissan Motor Co., Ltd., Yokohama-shi, Kanagawa (JP)

(72) Inventors: Tomoharu Takezawa, Kanagawa (JP); Shinsuke Takakura, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 15/303,540

(22) PCT Filed: Feb. 12, 2015

(86) PCT No.: PCT/JP2015/053736
§ 371 (c)(1),
(2) Date: Oct. 12, 2016

(87) PCT Pub. No.: WO2015/182174
PCT Pub. Date: Dec. 3, 2015

(65) Prior Publication Data
US 2017/0030302 A1    Feb. 2, 2017

(30) Foreign Application Priority Data

May 27, 2014   (JP) ................................ 2014-108636

(51) Int. Cl.
*F02M 33/02*    (2006.01)
*F02M 25/08*    (2006.01)
(Continued)

(52) U.S. Cl.
CPC ... *F02M 25/0836* (2013.01); *B60K 15/03006* (2013.01); *B60K 15/03519* (2013.01);
(Continued)

(58) Field of Classification Search
CPC .......... F02M 25/0836; F02M 25/0854; F02M 25/089; F02M 25/0872; F02M 35/10222;
(Continued)

(56) References Cited

U.S. PATENT DOCUMENTS 9,617,932 B2 *   4/2017   Iwaya ................... F02D 41/004
2014/0174573 A1 *  6/2014   Matsunaga ...... B60K 15/03519
137/565.23
(Continued)

FOREIGN PATENT DOCUMENTS

| JP | 7-217505 A | 8/1995 |
|---|---|---|
| JP | 2004-156499 A | 6/2004 |
| JP | 2013-185527 A | 9/2013 |

*Primary Examiner* — Hai Huynh
(74) *Attorney, Agent, or Firm* — Global IP Counselors, LLP

(57) ABSTRACT

A fuel evaporative emission processing system suitable for a hybrid vehicle includes a fuel vapor passage, a shut-off valve, a purge passage, a first purge control valve, and a second purge control valve. The shut-off valve selectively opens and closes the fuel vapor passage communicating between a fuel tank and a canister. The first purge control valve opens and closes the purge passage communicating between the canister and an intake air passage of an internal combustion engine. The second purge control valve selectively opens or closes the tank opening passage communicating between the purge passage on an upstream side of the first purge control valve and the fuel tank. When purging the canister, by opening the second purge control valve, the evaporative fuel inside the fuel tank is directly processed by the internal combustion engine, so that increase in the amount of adsorption in the canister can be suppressed.

16 Claims, 3 Drawing Sheets

(51) Int. Cl.
*B60K 15/03* (2006.01)
*F02M 35/10* (2006.01)
*B60K 15/035* (2006.01)

(52) U.S. Cl.
CPC ...... *F02M 25/089* (2013.01); *F02M 25/0854* (2013.01); *F02M 25/0872* (2013.01); *F02M 35/10222* (2013.01); *B60K 2015/03026* (2013.01); *B60K 2015/03296* (2013.01); *B60K 2015/03514* (2013.01); *B60K 2015/03561* (2013.01)

(58) Field of Classification Search
CPC ........ B60K 15/03519; B60K 15/03006; B60K 2015/03514; B60K 2015/03026; B60K 2015/03296
USPC ................................ 123/516, 518, 519, 520
See application file for complete search history.

(56) References Cited

U.S. PATENT DOCUMENTS

| | | | |
|---|---|---|---|
| 2015/0059890 A1* | 3/2015 | Iwaya | F02M 25/0809 137/557 |
| 2015/0114360 A1* | 4/2015 | Werner | F02M 25/089 123/520 |
| 2017/0030303 A1* | 2/2017 | Takakura | F02M 25/0809 |
| 2017/0145963 A1* | 5/2017 | Dudar | F02M 25/0836 |

* cited by examiner

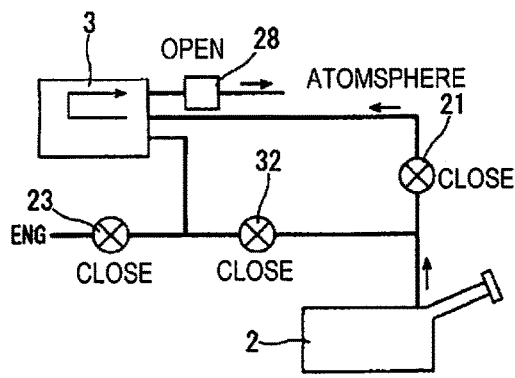
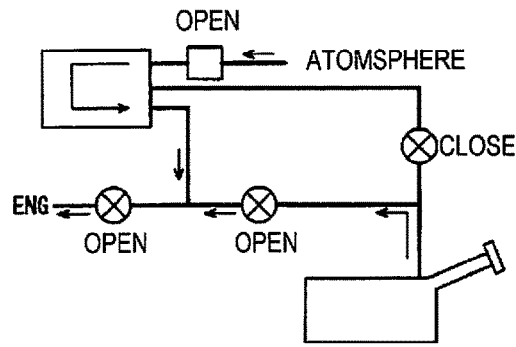
FIG. 2A    FIG. 2B
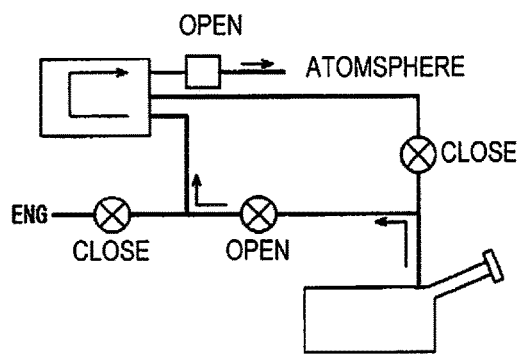
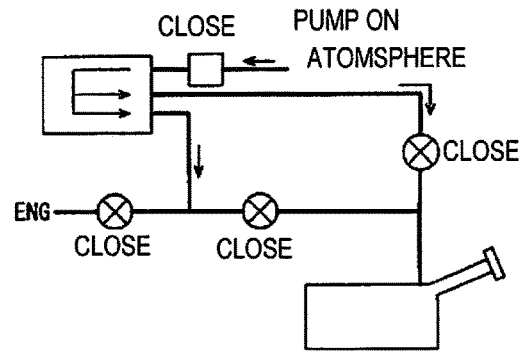
FIG. 2C    FIG. 2D
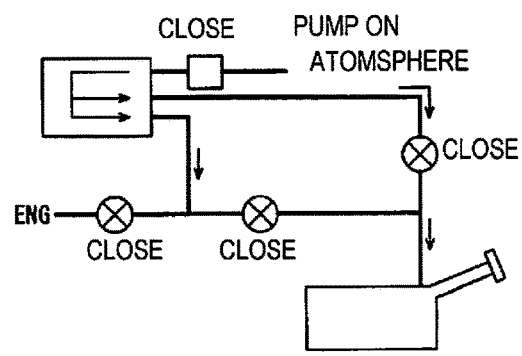
FIG. 2E

US 9,885,322 B2

FUEL EVAPORATIVE EMISSION PROCESSING SYSTEM

CROSS-REFERENCE TO RELATED APPLICATIONS

This application is a U.S. National stage application of International Application No. PCT/JP2015/053736, filed Feb. 12, 2015, which claims priority to Japanese Patent Application No. 2014-108636, filed on May 27, 2014.

BACKGROUND

Field of the Invention

The present invention relates to a processing system for processing an evaporative fuel emission generated in a fuel tank using a canister during refueling. In particular, the present invention relates to an evaporative fuel emission processing system for a so-called closed or sealed type fuel tank having a shut-off valve provided between the fuel tank and the canister.

Background Information

In order to prevent fuel vapor leaks to the outside, a fuel evaporative emission processing system has been widely known, in which fuel vapor generated in a vehicle fuel tank is temporarily adsorbed in a canister using an adsorbent such as activated carbon, and then, during the operation of the internal combustion engine, through introduction of fresh air to purge the evaporative fuel components from the canister and introduce into an intake system of the internal combustion engine. In addition, in recent years, as disclosed in Japanese Unexamined Patent Application Publication No. 2004-156499 (Patent Document 1), various types of evaporative fuel processing devices have been proposed in which a shut-off valve is provided in a fuel vapor passage connecting the fuel tank and the canister, and essentially by maintaining to close the shut-off valve except for the case of refueling, the fuel tank is maintained in a sealed state.

In the evaporative fuel emission processing system of the sealed type fuel tank having a shut-off valve described above, there is a concern that a pressure in the fuel tank reaches a high pressure value while the shut-off valve is closed. In Patent Document 1, when the tank pressure is high, by opening the shut-off valve during canister purging, reduction in the fuel tank pressure is proposed.

However, in the technique described in Patent Document 1, since the fuel vapor flowing out of the fuel tank when opening the shut-off valve to reduce the pressure in the fuel tank is headed towards the intake passage of the internal combustion engine via the canister, there is a concern that the amount of adsorption in the canister increases substantially. With such a state in which the amount of adsorption in the canister is increased, when performing refueling to a stopped vehicle, the amount of evaporative fuel flowing from the fuel tank into the canister will be too large to be sufficiently adsorbed.

SUMMARY

According to the present invention, an evaporative fuel emission processing system for an internal combustion engine is provided. The system comprises a fuel vapor passage, a shut-off valve, a purge passage, a first purge control valve, and a second purge control valve. The fuel vapor passage communicates with a fuel tank and a canister. The shut-off valve is interposed in the fuel vapor passage, and is configured to selectively open and close the fuel vapor passage. The purge passage communicates with the canister and an intake passage of the internal combustion engine. The first purge control valve is interposed in the purge passage, and is configured to selectively open and close the purge passage. The tank opening passage communicates with the purge passage in an upstream side position of the first purge control valve and the fuel tank. The second purge control valve interposed in the tank opening passage, and is configured to selectively open and close the tank opening passage.

In such a configuration, when purging is performed from the canister through the first purge control valve, by opening the second purge control valve, the air inside the fuel tank is directly communicative into the intake passage of the internal combustion engine. Thus, the evaporated fuel within the fuel tank is introduced into the intake passage of the internal combustion engine without going through the canister. Therefore, it is possible to reduce the pressure inside the fuel tank without increasing the adsorption amount of the canister.

According to the present invention, it is possible to reduce the pressure in the fuel tank without increasing the adsorption amount of the canister. Thus, it is possible to maintain the amount of adsorption in the canister low in preparation for refueling to secure the amount of evaporative fuel emission flowing out from the fuel tank to the canister.

BRIEF DESCRIPTION OF THE DRAWINGS

FIG. 2 is an explanatory view of the operation of the evaporative fuel emission processing system;

DETAILED DESCRIPTION OF THE EMBODIMENTS

Figure 1:
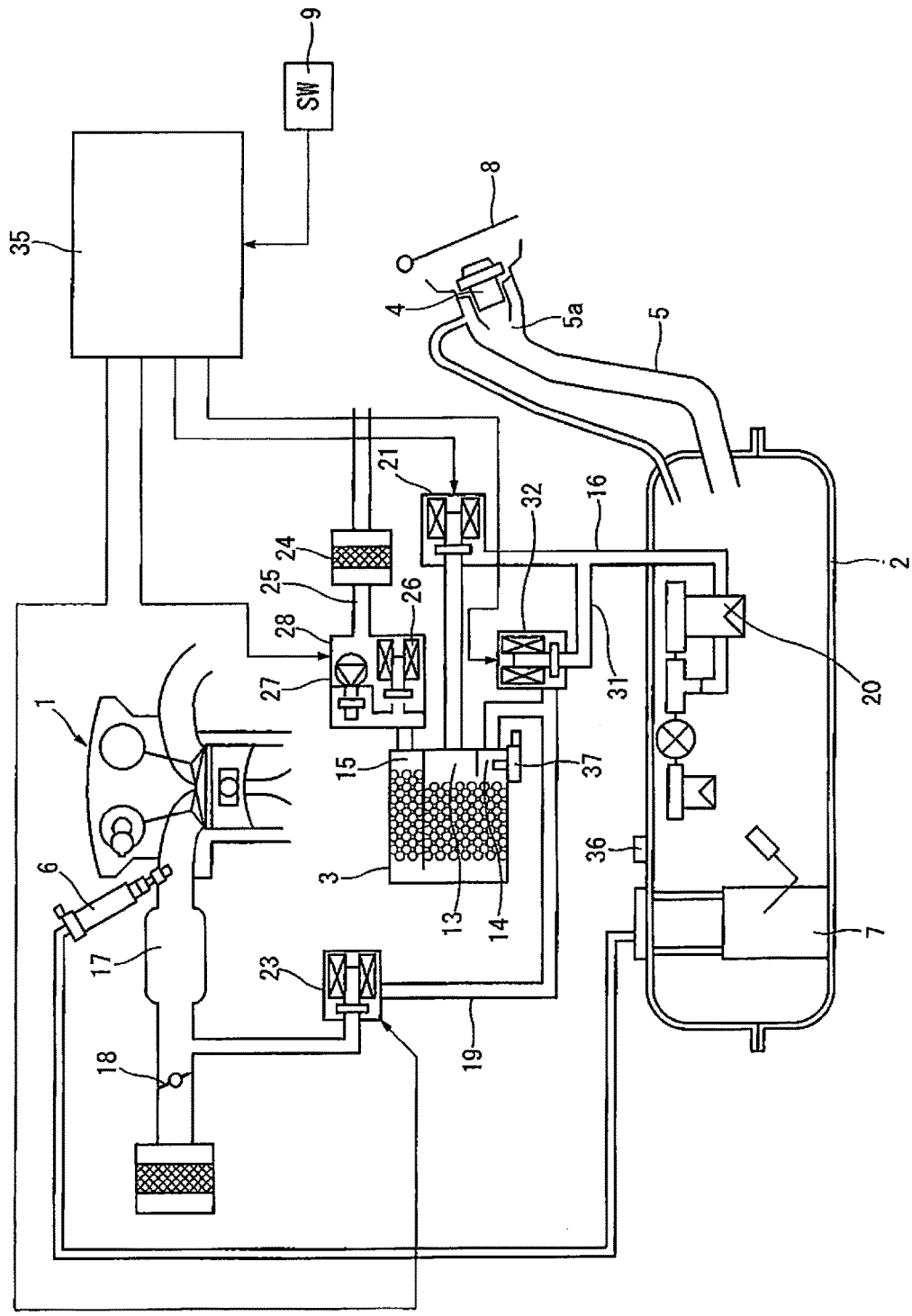
FIG. 1 is a configuration diagram showing an embodiment of an evaporative fuel emission processing system according to the present invention.

FIG. 1 is a configuration diagram showing an embodiment of an evaporative fuel emission processing system according to the present invention. In a vehicle not shown, an internal combustion engine is mounted and a sealed type fuel tank 2 is provided. In order to process evaporative fuel emission generated in the fuel tank 2 at the time of refueling, an evaporative fuel emission processing device with a canister 3 is provided. The fuel tank 2 is provided with a filler tube portion 5 at the tip of which a filler cap 4 is detachably attached to a fuel supply port 5a. Also, a fuel pump unit 7 for supplying a fuel to a fuel injection device 6 of the internal combustion engine 1 is housed inside the fuel tank 2. The fuel supply port 5a is covered with a fuel lid 8 which is electrically locked in order for the filler cap 4 to be prevented from opening in a state of high pressure inside the fuel tank 2. The fuel lid 8 is unlocked in a state in which the pressure in the fuel tank is lowered in response to a signal of a lid open switch 9 located in a driver's seat or the like. Note that, instead of locking of the fuel lid 8, the filer cap 4 can be locked itself.

In the canister 3, a flow path is formed in a U-turn shape by a synthetic resin case, in which the adsorbent made of activated carbon or the like is filled. At one end of the flow direction of the flow path forming the U-turn shape, a charge port 13 serving as the inflow portion of the fuel vapor is formed and purge port 14 serving as the outlet of the purge gas containing fuel component are provided. At the other end of the flow direction, a drain port 15 is provided for taking in outside air during purging.

The charge port 13 is connected to an upper space of the fuel tank 2 via the fuel vapor passage 16. Note that the tip of the fuel vapor passage 16 on the side of the fuel tank 2 is communicative to the upper space of the fuel tank 2 via a FLV valve 20 which will prevent liquid fuel from overflowing in the fuel vapor passage 16 when the fuel level is at a high position. Further, in the middle of the fuel vapor passage 16, a shut-off valve 21 provided for selectively open or close the fuel vapor passage 16. Essentially, the shut-off valve 21 is provided to put the fuel tank 2 in a sealed state by blocking a position between the canister 3 and the fuel tank 2 except during refueling, and is formed in a normally closed type solenoid or electromagnetic valve which is closed during non-energization.

The purge port 14 is connected to an intake system of the internal combustion engine 1, for example, to the downstream side of the throttle valve 18 the intake passage 17 through a purge passage 19. In the purge passage 19, a first purge control valve 23 is provided for selectively closing or opening the purge passage 19 to thereby control introduction of purge gas to the internal combustion engine 1. In addition to time of stopping of the internal combustion engine 1, when a predetermined condition is met such as pre-warmed up state or during a fuel cut, in order to prohibit the introduction of the purge gas, the first purge control valve 23 is closed. The first purge control valve 23 is similarly constituted also from the normally closed type, solenoid or electromagnetic valve.

The drain port 15 is connected to a drain passage 25 a tip of which is opened to the atmosphere through a filter 24. In addition, a drain cut valve 26 is dispose in a drain passage 25 for selectively open and close the drain passage 25. The drain cut valve 26 is constituted from a normally open electromagnetic valve which will be open when not energized. The drain cut valve 26 can be closed, in addition to during a leak diagnosis, for example, when a canister 3 is detected to be broken in one way or another. However, the drain cut valve 26 is basically set in an open state to release the drain passage 25. Further, in parallel to the drain cut valve 25, a pressurizing pump 27 is provided for pumping air toward the canister 3. The pressurizing pump 27 and the drain cut valve 26 are integrally formed as a leak diagnosis module 28.

Between the fuel vapor passage 16 and the purge passage 19, more specifically, between a position in the fuel vapor passage 16 on the side of the fuel tank 2 with respect to the shut-off valve 21 and a position in the purge passage 19 upstream of (i.e. on the side of canister 3) the first purge control valve 23, a tank opening passage 31 communicating the two passages is provided. In addition, in the middle of the tank opening passage 31, a second purge control valve 32 is provided for selectively open and close the tank opening passage 31. The second purge control valve 32 is constructed from a normally closed solenoid or electromagnetic valve to be closed when not energized. Here, the second purge control valve 32 is formed with a passage area smaller than a passage area of the shut-off valve 21. More specifically, the diameter of the port of the second purge control valve 32, which is selectively closed and opened with a plunger is formed smaller compared to that of the shut-off valve 21.

Note that the shut-off valve 21 is provided with a sufficiently large passage area so as not to impair smooth refueling process.

The shut-off valve 21, the first purge control valve 23, the second purge control valve 32, the drain cut valve 26, and the pressurizing pump 27 are controlled appropriately by an engine control unit 35 that performs a variety of controls of the internal combustion engine 1 (e.g., a fuel injection amount control, a fuel injection timing control, an ignition timing control, an opening control of a throttle valve 18, and the like). As described later, reduction of tank pressure before opening of the filler cap 4 during refueling, adsorption during refueling processing, purge processing during engine operation, and leak check of each part of the system, and the like are executed. Further, as a pressure sensor for detecting the pressure in the system, in addition to a tank pressure sensor 36 being attached to the fuel tank 2, a sensor for an evaporation line pressure (hereinafter, abbreviated as evapo-line pressure) 37 is attached in the vicinity of the purge port 14 of the canister 3. The tank pressure sensor 36 is intended to detect a pressure of the system, i.e. in a region on the side of the fuel tank 2 (pressure in the upper space of the specific fuel tank 2) defined by the shut-off valve 21 and the second purge control valve 32. The evapo-line pressure sensor 37 is intended to detect a pressure in a region containing the canister 3 and surrounded by the shut-off valve 21, the second purge control valve 32, the drain cut valve 26, and the first purge control valve 23.

Note that a positive pressure relief valve which opens mechanically when the pressure in the fuel tank 2 is abnormally increased and a negative pressure relief valve which opens when the pressure in the fuel tank 2 is abnormally decreased may be provided when necessary. However, these relief valves are not shown in FIG. 1.

In the fuel evaporative emission processing system configured above, basically, only the fuel vapor generated during refueling is adsorbed by the canister 3. Thus, except during fueling, the adsorption of the fuel vapor by the canister 3 is not performed. That is, the evaporative fuel emission processing system in the present embodiment is preferred for use in a hybrid vehicle capable of the so-called EV traveling in a state of stopping the internal combustion engine 1. In this type of vehicle, the opportunity of purging of the canister 3 is less frequent, the adsorption of the fuel vapor by the canister 3 is constrained during refueling only.

During refueling, in a state where the drain cut valve 26 is open, the first purge control valve 23 and the second purge control valve 32 are closed with the shut-off valve 21 open. Thus, the inside of the fuel tank 2 and the charge port 13 of the canister 3 is made communicative. Accordingly, fuel evaporative emission generated in the fuel tank 2 is introduced into the canister 3 and adsorbed by the adsorbent therein.

Then, when refueling is completed, the shut-off valve 21 is closed. Therefore, a sealed state in which the inside of the fuel tank 2 is separated from the canister 3. Thus, during the stopped state of the internal combustion engine 1, the adsorption amount of the canister 3 does not basically change.

Thereafter, when the operation of the vehicle is started, and the internal combustion engine 1 reaches a predetermined operating state, while maintaining the shut-off valve 21 in a closed state, the first purge control valve 23 is opened appropriately to purge fuel component from the canister 3. More specifically, due to a pressure difference with respect to the intake system of the internal combustion engine 1, air is introduced from the drain port 15 and the fuel component that is purged from the adsorbent due to the air is introduced into the intake passage of the internal combustion engine 1 through the first purge control valve 23. Therefore, during the operation of the internal combustion engine 1, the adsorption amount of the canister 3 gradually decreases. Here, in the present embodiment, during purging of the canister 3 via the first purge control valve 23, the second purge control valve 32 is opened. Thus, in parallel with the purging of the canister 3, the pressure in the fuel tank 2 is released and processing of the fuel evaporative emission in the fuel tank 2 (direct processing without using canister 3) is performed.

As described, in the present fuel evaporative emission processing system, during the operation of the internal combustion engine 1, since the evaporative fuel within the fuel tank 2 is treated aggressively with internal combustion engine 1, the amount of the evaporative fuel remaining in the fuel tank 2 is relatively small during refueling. Further, when processing directly the evaporative fuel in the fuel tank 2 by the internal combustion engine 1, since the evaporative fuel does not pass through the canister 3, there is no increase in the adsorption amount of the canister 3. Further, since the pressure in the fuel tank 2 is released frequently during the operation of the internal combustion engine 1, the high pressure is prevented from occurring.

Further, the second purge control valve 32 is also made use of for releasing the pressure in the fuel tank 2 at the start of refueling. That is, during refueling, as described above, the shut-off valve 21 is opened. However, when the shut-off valve 21 of a large passage area is opened in a state in which a high pressure prevails in the fuel tank 2, there is a risk that the fuel vapor blows through the canister 3 to the outside. Thus, in the present embodiment, when detecting the operation of the lid open switch 9, the second purge control valve 32 is firstly opened with the drain cut valve 26 in an open state. Thus, the pressure in the fuel tank 2 is released through the canister 3. Then, in a state in which the pressure in the fuel tank 2 is close to the atmospheric pressure, the shut-off valve 21 is opened to thereby allow the fuel tank 2 to be exposed to the atmospheric pressure. Since the passage area or the opening diameter of the second purge control valve 32 is smaller than the shut-off valve 21, the initial release of the pressure through the canister 3 takes place slowly to some extent so that the blow-by of the fuel vapor will be prevented. In other words, releasing of the pressure is to be performed in two stages by the second purge control valve 32 and the shut-off valve 21. Therefore, it is possible to suppress the blow-by of the evaporative fuel while realizing a quick pressure release. Note that, compared to a case of controlling the opening in two stages with a single shut-off valve, in the present embodiment, the respective constructions of the shut-off valve 21 and the second purge control valve 32 are simple as well as the controls thereof are simple. In addition, since the second purge control valve 32 which opens in a state of high pressure in the fuel tank 2 is small in opening diameter compared to the shut-off valve 21, it is advantageous that the solenoid thrust required for opening under high pressure can be small.

Further, in the present embodiment, since the second purge control valve 32 and the first purge control valve 23 is configured to be arranged in series between the fuel tank 2 and the intake passage 17, the actual layout within the vehicle is advantageous in that communication between the internal combustion engine 1 (intake passage 17) and the canister 3 is completed by a single piping. In particular, it is advantageous when the canister 3 is placed in the vicinity of the fuel tank 2. At the time of opening of the pressure in the fuel tank 2 during refueling start as described above, since the first purge control valve 23 is present downstream of the second purge control valve 32, the fuel vapor into the intake passage 17 side is prevented from flowing.

FIGS. 2A to 2E are an explanatory view of the opening/closing states of each valve and gas flow in various modes. Below, with reference to this figure, a description is given of the operation of the evaporative fuel emission processing system specifically.

FIG. 2A shows a control mode during refueling, and as described above, the drain cut valve 26 is open, the first and second purge control valve 23, 32 are closed, and the shut-off valve 21 is opened. Along with refueling, gas containing fuel evaporative from the fuel tank 2 flows to the outside through the canister 3. The fuel evaporative emission is adsorbed in the canister 3. Note that, by using the shut-off valve of a sufficiently large port diameter, smooth lubrication will not be impaired.

FIG. 2B shows a control mode in which, during the operation of the internal combustion engine 1, the pressure of the fuel tank 2 is released and the fuel evaporative emission of the fuel tank 2 is being directly processed or treated. As described above, the processing of fuel vapor in the fuel tank 2 takes place in parallel with the purging of the canister 3. In this state, the drain cut valve 26 is opened, the first purge control valve 23 and the second purge control valve 32 are respectively opened, and the shut-off valve 21 is closed. Thus, air passes through the canister 3 through the drain cut valve 26, and is introduced into the intake passage 17 of the internal combustion engine as purge gas. At the same time, the evaporative fuel within the fuel tank 2 is introduced into the intake passage 17 through the second purge control valve 32 and the first purge control valve 23. Since the shut-off valve 21 is closed, it is not likely that the fuel vapor bypasses into the canister 3.

Figure 3:
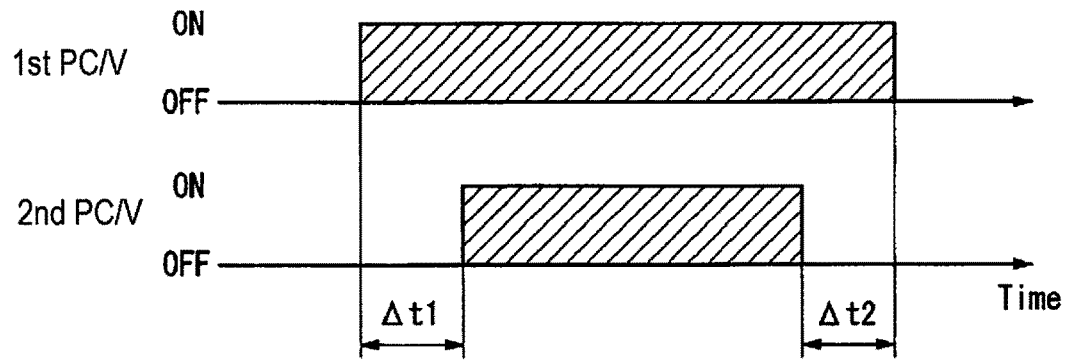
FIG. 3 is a time chart showing the relationship of opening periods of the first purge control valve and a second purge control valve.

Here, the second purge control valve 32 is controlled to open as shown in a period shown in FIG. 3, with respect to the valve opening period of the first purge control valve 23. That is, after the first purge control valve 23 opens in response to satisfying a predetermined purge condition during operation of the internal combustion engine 1, with a suitable delay time $\Delta t1$, the second purge control valve 32 is allowed to open. This measure is intended to prevent a backflow of the vaporized fuel by opening the second purge control valve 32 while ensuring that the pressure in the vicinity of the second purge control valve 32 is surely a negative pressure after opening the first purge control valve 23. The delay time $\Delta t1$ is determined in accordance with a passage area and a passage length extending from the first purge control valve 23 up to the air opening through the canister 3, and is subject to control by a software timer.

In addition, when completing the purge or exiting the purge in response to a departure from the purge condition of the canister 3, the second purge control valve 32 is closed in advance, and after elapse of a suitable delay time $\Delta t2$, the first purge control valve 23 is closed. This measure is intended to ensure that the evaporative fuel from the fuel tank 2 will not directed to the canister 3. The delay time $\Delta t2$ is determined in accordance with a passage area and a passage length extending from the second purge control valve 32 to the first purge control valve 23, and is subject to control by a software timer. Note that, due to the difference in passage length, the delay time $\Delta t2$ on the closing side is generally shorter than the delay time $\Delta t2$ on the opening side.

FIG. 2C shows an operation to be executed immediately before refueling start for releasing a pressure in the fuel tank 2 where the drain cut valve 26 is opened, the first purge control valve 23 is closed, the second purge control valve 32 is opened, and the shut-off valve 21 is closed. The high pressure in the fuel tank 2 is released to the outside from the canister 3 via the second purge control valve 32 with the small passage area. As described above, at a stage in which the pressure in the fuel tank 2 is close to the atmospheric pressure, the second purge control valve 32 is closed and the shut-off valve 21 is opened so as to proceed to the state shown in FIG. 2A.

Figure 4:
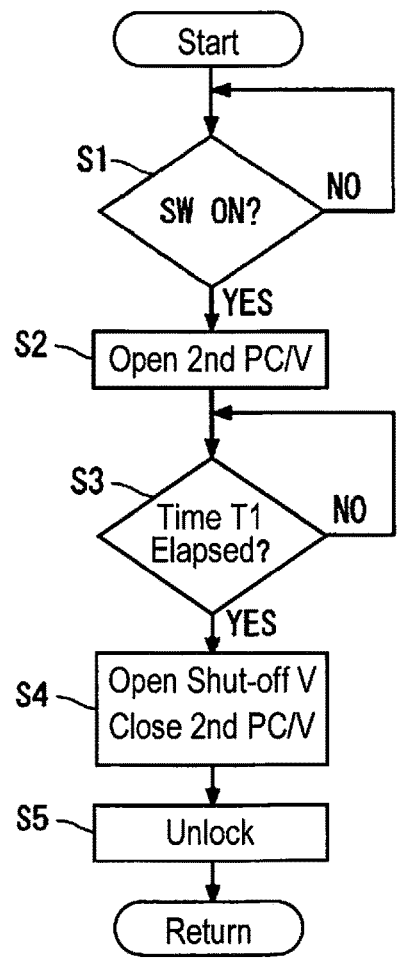
FIG. 4 is a flow charge of the pressure releasing operation immediately before start refueling.

FIG. 4 is a flowchart showing a flow of control of the pressure release operation immediately before refueling start. In step S1, it is repeatedly determined whether or not the lid open switch 9 is operated ON. When the lid open switch 9 is operated ON, control proceeds step S2 and the second purge control valve 32 is opened. Note that, when the first purge control valve 23 and the shut-off valve 21 are in the open state, these valves are closed in step S2 at the same time. In step S3, it is determined whether or not a predetermined time T1 has elapsed has elapsed from the ON operation of the lid open switch 9. The predetermined time T1 corresponds to a time required for the pressure in an expected high pressure state of the fuel tank 2 to be close to atmospheric pressure so as to prevent blow-by from occurring at the time the shut-off valve 21 is opened. When the predetermined time T1 has elapsed, the process proceeds to step S4 where the shut-off valve 21 is opened while the second purge control valve 32 is closed. The opening operation of the shut-off valve 21 allows for the pressure in the fuel tank 2 to decrease promptly. Subsequently, in step S5, the fuel lid 8 is unlocked so as to allow the filler cap 4 to be removed. Note that, instead of closing the second purge control valve 32 at step 4, it may be held open until refueling completion together with the shut-off valve 21.

FIGS. 2D and 2E are operation explanatory diagrams for explaining a leak diagnosis of the fuel evaporative emission processing system. For example, after stopping the vehicle, the inside of the system is pressurized with the pressurizing pump 27, and determination is made of a leak based on the presence or absence of a subsequent pressure drop. Here, in order to avoid outflow of fuel vapor due to the opening of the shut-off valve 21, first, as shown in FIG. 2D, in a state in which the shut-off valve 21 and the second purge control valve 32 are closed along with the first purge control valve 23 and the drain cut valve 26, the pressurizing pump 27 is driven to pressurize on the side of the canister 3. Subsequently, in the state in which the pressure on the canister side detected by the evapo-line line pressure sensor 37 is equal to or higher than the pressure on the side of the fuel tank 2, as shown in FIG. 2E, the shut-off valve 21 is opened, and the entire system is placed in a pressurized state by the pressurizing pump 27. Then, at the stage where the system inside reaches a predetermined pressurized state, the pressurizing pump 27 is stopped, and the subsequent pressure change is monitored by the evapo-line pressure sensor 37 and the tank pressure sensor 36. When a pressure drop of a predetermined level is not detected within a predetermined time, the system is diagnosed as no leakage.

Note that, by separating the system into two regions, i.e. a side of the canister 3 and a side of the fuel tank 2, it is possible to make a diagnosis for a leak. In this case, after pressurizing the canister side with the shut-off valve 21 closed, a leak diagnosis is performed in a region on the side of the canister 3 by monitoring a pressure change using the evapo-line pressure sensor 37. Subsequently, after the entire inside of the system is in a pressurized state with the shut-off valve 21 opened once, and followed by the closing the shut-off valve 21 again, a leak diagnosis is performed in a region on the side of the fuel tank 2 by monitoring a pressure change using the tank pressure sensor 36.

As described above, a description is given of an embodiment according to the present invention, the present invention is not limited to the above embodiments. Rather, various modifications are possible. Further, the present invention is not limited to a hybrid vehicle, and is widely applicable to a vehicle having an internal combustion engine and a fuel tank.

The invention claimed is:

1. A fuel evaporative emission processing system for an internal combustion engine, comprising:
   a fuel vapor passage communicating a fuel tank and a canister;
   a shut-off valve interposed in the fuel vapor passage and configured to selectively open and close the fuel vapor passage,
   a purge passage communicating the canister and an intake passage of the internal combustion engine;
   a first purge control valve interposed in the purge passage and configured to selectively open and close the purge passage;
   a tank opening passage communicating the purge passage in an upstream side position of the first purge control valve and the fuel tank;
   a second purge control valve interposed in the tank opening passage and configured to selectively open and close the tank opening passage; and
   a purge control mechanism configured to purge the canister by controlling the first purge control valve during operation of the internal combustion engine, wherein the purge control mechanism is configured to process the evaporative fuel emission in the fuel tank by the internal combustion engine by opening the second purge control valve during purging of the canister.

2. The fuel evaporative emission processing system according to claim 1, wherein
   the second purge control valve is formed with a passage area smaller than a passage area of the shut-off valve.

3. The fuel evaporative emission processing system according to claim 2, wherein
   the purge control mechanism is configured to open the second purge control valve with a delay time from the opening of the first purge control valve.

4. The fuel evaporative emission processing system according to claim 2, further comprising
   a tank pressure control mechanism configured to allow the pressure in the fuel tank to be close to an atmospheric pressure before a fuel supply port of the fuel tank is opened, wherein the tank pressure control mechanism is configured to open the shut-off valve after the second purge control valve is opened.

5. The fuel evaporative emission processing system according to claim 2, further comprising
   a control mode in which the shut-off valve is closed, and the first and second purge control valves are opened.

6. The fuel evaporative emission processing system according to claim 2, further comprising
   a drain cut valve configured to selectively open and close a drain passage of the canister.

7. The fuel evaporative emission processing system according to claim 1, wherein
   the purge control mechanism is configured to open the second purge control valve with a delay time from the opening of the first purge control valve.

8. The fuel evaporative emission processing system according to claim 7, further comprising
a tank pressure control mechanism configured to allow the pressure in the fuel tank to be close to an atmospheric pressure before a fuel supply port of the fuel tank is opened, wherein the tank pressure control mechanism is configured to open the shut-off valve after the second purge control valve is opened.

9. The fuel evaporative emission processing system according to claim 7, further comprising
a control mode in which the shut-off valve is closed, and the first and second purge control valves are opened.

10. The fuel evaporative emission processing system according to claim 7, further comprising
a drain cut valve configured to selectively open and close a drain passage of the canister.

11. The fuel evaporative emission processing system according to claim 1, further comprising
a tank pressure control mechanism configured to allow the pressure in the fuel tank to be close to an atmospheric pressure before a fuel supply port of the fuel tank is opened, wherein the tank pressure control mechanism is configured to open the shut-off valve after the second purge control valve is opened.

12. The fuel evaporative emission processing system according to claim 11, further comprising
a control mode in which the shut-off valve is closed, and the first and second purge control valves are opened.

13. The fuel evaporative emission processing system according to claim 11, further comprising
a drain cut valve configured to selectively open and close a drain passage of the canister.

14. The fuel evaporative emission processing system according to claim 1, further comprising
a control mode in which the shut-off valve is closed, and the first and second purge control valves are opened.

15. The fuel evaporative emission processing system according to claim 14, further comprising
a drain cut valve configured to selectively open and close a drain passage of the canister.

16. The fuel evaporative emission processing system according to claim 1, further comprising
a drain cut valve configured to selectively open and close a drain passage of the canister.

* * * * *